(12) United States Patent
Brune

(10) Patent No.: US 7,800,489 B2
(45) Date of Patent: Sep. 21, 2010

(54) METHOD FOR OPERATING AN AUTOMATION APPLIANCE, AND AUTOMATION APPLIANCE

(75) Inventor: Richard Brune, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 505 days.

(21) Appl. No.: 11/622,239

(22) Filed: Jan. 11, 2007

(65) Prior Publication Data

US 2007/0188296 A1 Aug. 16, 2007

(30) Foreign Application Priority Data

Jan. 11, 2006 (DE) .................. 10 2006 001 500

(51) Int. Cl.
*G08B 13/14* (2006.01)
(52) U.S. Cl. .................. 340/506; 340/521; 340/522; 340/825.36; 340/825.49
(58) Field of Classification Search .................. 340/506, 340/517, 521, 522, 524, 525, 825.36, 825.49
See application file for complete search history.

(56) References Cited

U.S. PATENT DOCUMENTS 5,400,246 A * 3/1995 Wilson et al. .................. 700/17

FOREIGN PATENT DOCUMENTS

DE  101 48 160 A1  4/2003
EP  1312990 A2  5/2003

OTHER PUBLICATIONS

Bergan, M.; Alty, J. L.: "Multimedia interface design in process control", IEE Colloquium on Interactive Multimedia: A Review and Update for Potential Users, Sep. 23, 1992, 9/1-9/5.
Benson, D. at al:"Multimedia data management for process control", Proceedings of the International Conference on Multimedia Computing and Systems, 15-19 Mal 1994, 332-341.
Alty, J,L.: "Multi-media interfaces in process control—a methodological approach", International Conference on Systems, Man and Cybernetics, Oct. 17-20, 1993, 361-366.
Seiichi Shindo, Kakoto Tsukiyama, Saburo Tanaka, Shingo Aya, "Multimedia support to stormwater pump operation" IEEE Int. Conf. on Beijing, Oct. 14-17, 1996, pp. 1339-1344 XP010207000 ISBN: 978-0-7803-3280-5; Magazine; 1996.

* cited by examiner

*Primary Examiner*—Daryl Pope
(74) *Attorney, Agent, or Firm*—Henry M. Feiereisen; Ursula B. Day

(57) ABSTRACT

An automation appliance and a method for operating an automation appliance are disclosed. Media data, particularly audio and/or video data, are used to display data relating to the status and/or to the configuration of the automation appliance. The disclosed method for operating an automation appliance significantly improves user guidance.

8 Claims, 1 Drawing Sheet

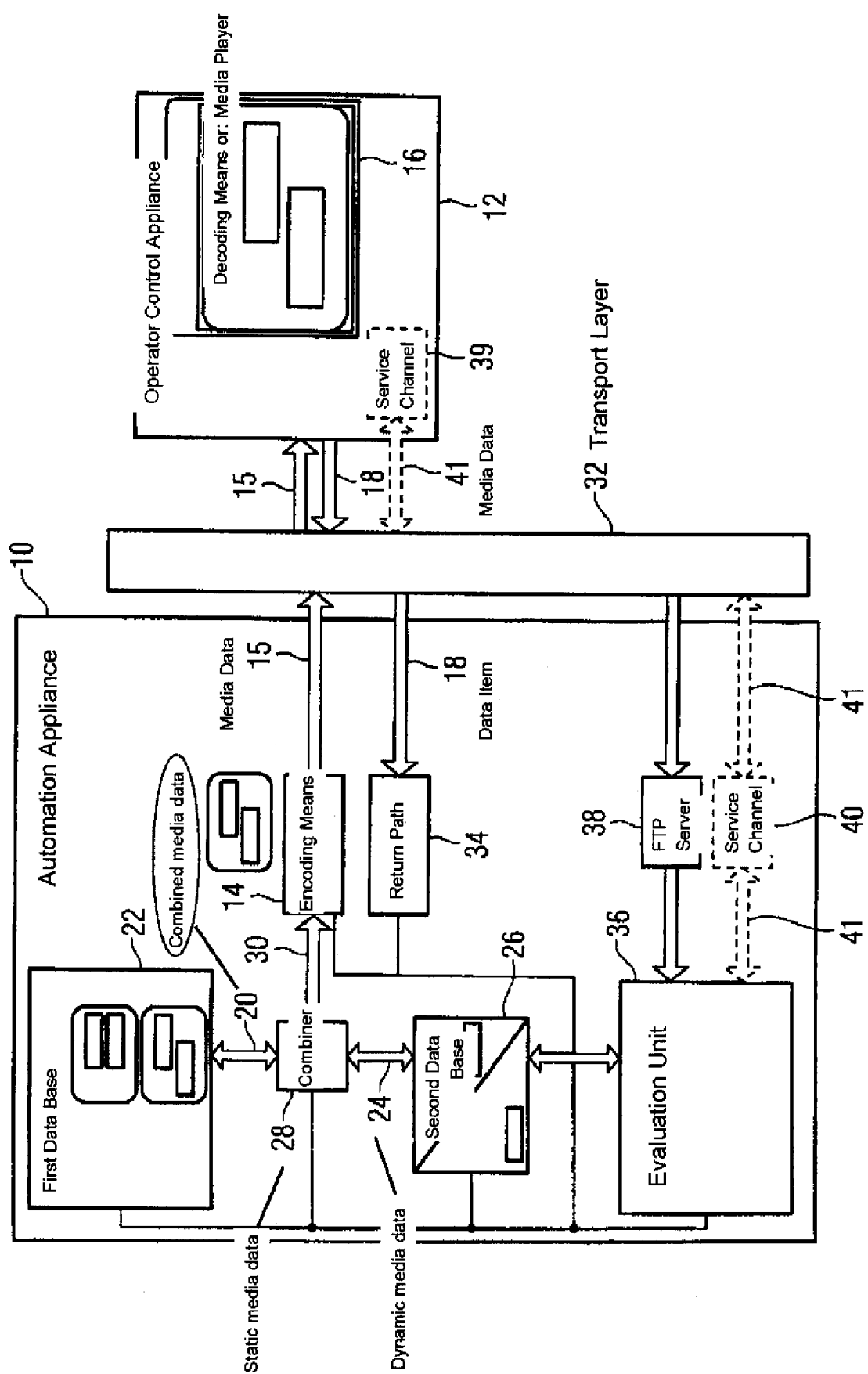

METHOD FOR OPERATING AN AUTOMATION APPLIANCE, AND AUTOMATION APPLIANCE

CROSS-REFERENCES TO RELATED APPLICATIONS

This application claims the priority of German Patent Application, Serial No. 10 2006 001 500.2, filed Jan. 11, 2006, pursuant to 35 U.S.C. 119(a)-(d), the content(s) of which is/are incorporated herein by reference.

BACKGROUND OF THE INVENTION

The invention relates to a method for operating an automation appliance in combination with a connected operator control appliance. More particularly, the invention relates to the operation of an automation appliance when accessing data from the automation appliance, configuring or parameterizing the automation appliance, or reading status information from the automation appliance.

The term "automation appliance" covers all appliances, devices or systems, i.e., not only controllers, for example, such as programmable logic controllers, process computers, (industrial) computers and the like, but also drive controllers, frequency converters and the like, as are or can be used for controlling, regulating and/or monitoring technological processes, e.g. for reshaping or transporting material, energy or information etc., with energy being expended or converted particularly using suitable technical devices, such as sensors or actuators. An automation appliance can also include a web server and/or a web client.

However, this conventional approach does not yet give sufficient consideration to improving interactive user guidance.

It would therefore be desirable and advantageous to provide an improved method for operating an automation appliance, which obviates prior art shortcomings and is able to specifically improve user guidance.

SUMMARY OF THE INVENTION

According to one aspect of the invention, a method for operating an automation appliance and an operator control appliance connected to the automation appliance, wherein the automation appliance includes encoding means for encoding media data, and the operator control appliance includes decoding means for decoding the media data, has the following the steps: transmitting at least one data item from the operator control appliance to the automation appliance, said data item including a request for media data from the automation appliance, generating with the encoding means media data in accordance with the received at least one data item, transmitting the generated media data from the automation appliance to the operator control appliance, and decoding the received media data with the decoding means for display on the operator control appliance.

According to another aspect of the invention, an automation appliance includes means for receiving from a remote appliance at least one data item which includes a request for media data, a first database having stored therein static media data, a second database having stored therein dynamic media data, a combiner for combining the static and dynamic media data to form the media data, an encoder for encoding the combined media data, and an interface for transferring the encoded combined media data to the remote appliance for decoding and display.

According to yet another aspect of the invention, a computer program includes program code instructions embodied in a computer-readable medium, which when executed on a computer, causes the computer to generate, in response to receiving from a remote appliance at an automation appliance at least one data item, media data in accordance with the received at least one data item, and transmit the generated media data from the automation appliance to the operator control appliance for decoding and display on the operator control appliance.

The invention is also directed to a computer-readable medium with a computer program capable of carrying out the method of the invention.

The invention therefore provides for media data to be transmitted to the operator control appliance for the purpose of user guidance. However, the term "media data" in the context of the present invention has a narrow definition, excluding "pure" text, i.e., only text in formatted form, or text together with formatting instructions. Rather, the invention involves transmitting data embedded in media data in the form of image information, which for configurations, parameterizations or status checks can also include numerical values and/or text information.

Specific embodiments of the encoding and decoding means are known from applications in the field of personal computers. There, a "media server" provides image information, possibly image information and sound information, in a continuous data stream, this data stream being processed, i.e. decoded and displayed, by a "media player". To extend and transfer this concept to the field of use for automating technical processes, the invention provides that, by way of example, for checking the state, the checked state information, i.e., the state information which is originally in the form of pure numerical values and/or text data on the automation appliance, is transferred to such a data stream and that this data stream, the media data, is transmitted to the connected operator control appliance for display. In the simplest case, the data, which in addition to the checked state data are then part of the media data, can be considered to be a type of "background image" which is displayed on the operator control appliance together with the checked state data. In place of a "simple background", it is naturally also possible to provide any other information which can be transmitted as part of such media data, e.g. video sequences for illustrating a handling procedure in connection with an installation process of the like.

The advantage of the invention is that by transmitting media data the bandwidth of the communicable information rises significantly. In addition, specifically in connection with installation procedures, a graphical illustration of the handling operations required therefor is often both more helpful and quicker for the respective operator to grasp than looking in a handbook, which was required previously.

Advantageous embodiments of the invention may include one or more of the following features.

Advantageously, to obtain the media data, static media data from a first database for static media data and dynamic media data from a second database for dynamic media data are combined. In this context, both databases are either disposed directly on the automation appliance or are disposed such that the automation appliance has access to these databases. Examples of static media data are an invariable screen background or an internal view of an appliance which is to be operated, for example. In addition, suitable static data are also media data which are based on static state information or configuration data, for example, i.e., an appliance view in combination with an appliance's serial number. Dynamic media data are primarily video and/or audio data which are provided for communicating additional information or, in individual cases, also simply for graphically illustrating the transmitted state or configuration data.

According to another advantageous embodiment of the invention, static and/or dynamic media data can be combined on the basis of the received data item such that the data item is selected or produced on the operator control appliance according to a selection by an operator, that the data item references those static and/or dynamic media data which are associated with the operator's selection on the basis of a predetermined or dynamic relationship, and that the referenced media data are combined, the combined media data are subsequently encoded and finally the encoded media data are transmitted to the operator control appliance in response to the transmitted data item. The data item transferred from the operator control appliance to the automation appliance therefore acts as an identifier for the automation appliance's respective data checked using the operator control appliance. In this case, however, the data item references not only the respectively checked data, i.e., state or configuration data, for example, but also, in addition, those static and/or dynamic media data which are associated with the underlying selection by the user. The underlying association in this respect may be prescribed on the basis of a stipulated or variable relationship.

To check simple configuration data, for example, the data item may include information which references a check on a hardware appliance number and on a version number for a piece of software implemented on the automation appliance. In addition, the data item may also reference, as media data, a graphic or a short video sequence which presents the respective automation appliance, for example.

This concept can be expanded as desired, particularly to the extent that the data item references a prescribed order for the check on data from the automation appliance, e.g. such that a background image of the appliance first of all shows the hardware appliance number, and after a predeterminable or predetermined time period has elapsed another background image, e.g. a data storage medium for computer programs, is used to be combined with the software version number.

Finally, the referenced static and/or dynamic media data may also represent screen masks and for the individual status and/or configuration information from the automation appliance to be dynamic media data. By referencing such data through an appropriate data item for the request by the operator control appliance and subsequently showing the resulting media data on the operator control appliance, it is possible to present even variable data, e.g. measured values recorded by external technical processes, in an attractive and clear manner for the user.

In the case of an automation appliance which is provided for controlling and/or monitoring a chemical process, for example, this may include, in relation to filling or emptying reactors, a numerical display of the fill level of the respective reactor in the form of first dynamic media data and/or visual display of the filling level, for example, by appropriate video sequences as second dynamic media data.

According to one advantageous embodiment for reproducing the media data on the operator control appliance, the process may be rewound to display positions which were already displayed or fast forwarded to display positions that have not yet been displayed. In this context, the possibility of rewinding is of interest particularly when it is necessary to verify past process steps quickly. This may be important to an installation operator when, in an exceptional situation, for example, he needs to make a decision on the basis of data which are currently no longer visible on the operator control appliance, e.g. on the basis of a fill volume which had been reached for a reactor which has since been emptied. In addition, the aspect of fast forwarding is relevant to experienced personnel, in particular, when the media data comprise image and/or audio information which is provided for assisting in the case of installation operations. In addition, or alternatively, provision may be made for it to be possible to stop display of the media data, so that the respective current data are shown or continue to be shown in the form of a still image.

In connection with the possibility of fast forwarding and/or rewinding, the media data may also include position identifiers, where a respective position identifier of this kind can be used for rapid alignment of the display position. Such position identifiers allow the transmitted media data to be structured, again with relevance particularly in relation to media data for supporting an installation operation, into different "chapters" in the manner of a handbook, so that the respective operator can objectively select the information of interest to him.

Fast and efficient transfer of the media data from the automation appliance to the operator control appliance is possible using communication which takes place at the level of the "transport layer" (layer 4 in the "OSI layer model"). This communication layer provides the protocol and security mechanisms which are required for the data which are to be transmitted, and is also still sufficiently fast and flexible to be able to handle the data volumes usually corresponding to media data in appropriate fashion, however.

BRIEF DESCRIPTION OF THE DRAWING

Other features and advantages of the present invention will be more readily apparent upon reading the following description of currently preferred exemplified embodiments of the invention with reference to the accompanying drawing, in which: the sole FIGURE shows schematically a simplified diagram of an automation appliance with a connected operator control appliance.

DETAILED DESCRIPTION OF PREFERRED EMBODIMENTS

The depicted embodiment is to be understood as illustrative of the invention and not as limiting in any way. In certain instances, details which are not necessary for an understanding of the present invention or which render other details difficult to perceive may have been omitted.

Turning now to the sole FIGURE, there is shown an automation appliance 10, e.g. what is known as a local field transmitter 10, which is communicatively connected to an operator control appliance 12. The communicative link between the automation appliance 10 and the operator control appliance 12 is, in particular, a bus link, e.g. a link via the "PROFINET". As encoding means 14 for encoding combined media data, the automation appliance 10 comprises what is known as a media server 14. Subsequently, the terms encoding means 14 and media server 14 are accordingly used synonymously. As corresponding decoding means 16 for decoding such media data, the operator control appliance 12 comprises what is known as a media player 16. Subsequently, the terms decoding means 16 and media player 16 are also accordingly used synonymously. To retrieve media data 15 from the automation appliance 10, a data item 18 is provided which is sent from the operator control appliance 12 to the automation appliance 10 in order to request the media data 15. The automation appliance 10 then generates the media data 15 using the encoding means 14 in line with the received data item 18. The generated media data 15 are then transmitted from the automation appliance 10 to the connected operator control appliance 12, where they are decoded, particularly decoded and displayed, by the decoding means 16.

To obtain the media data 15, static media data 20 from a first database 22 for static media data which is held on the automation appliance 10 or to which the automation appliance 10 has access and dynamic media data 24 from a second database 26 for dynamic media data which is likewise held on the automation appliance 10 or to which the automation appliance 10 has access are combined. For such combination of static and dynamic media data 20, 24, a combiner 28 is provided.

In this case, static and/or dynamic media data 20, 24 are combined on the basis of the received data item 18 such that the data item 18 is selected or produced on the operator control appliance 12 in line with a selection by an operator, that the data item 18 references those static and/or dynamic media data 20, 24 which are associated with the user's underlying selection on the basis of a stipulated or dynamic relationship, and that the combiner 28 combines the referenced media data 20, 24, the or each encoding means 14 is used for subsequently encoding the combined media data 30 and finally the encoded media data 15 are transferred to the operator control appliance 12 in response to the transmitted data item 18.

The media data 15 are transmitted from the automation appliance 10 to the operator control appliance 12 via the "transport layer" on the basis of the OSI layer model for systems which process communication information. For the purposes of illustration, the transport layer 32 is shown as a function block in FIG. 1. The task of the transport layer 32 includes segmenting data packets and "queue avoidance". The transport layer 32 is the bottommost layer, which allows full end-to-end communication between transmitter and receiver, in this case i.e., between the automation appliance 10 and the operator control appliance 12. In this context, the transmission takes place preferably on the basis of the "real time transport protocol" (RTP) or the "real time control protocol" (RTCP).

The combiner 28, which compiles the compiled media data 30 for the encoding means 14, also ensures the consistency of the information and data to be shown through appropriate protection mechanisms, so that, by way of example, there is always the assurance that "old" and "new" dynamic image components go together in valid fashion. At the output of the encoding means 14, there may be provision for the use of current compression methods in order to limit the media data 15 provided for transmission to the respective changed information contents, so as firstly to reduce the bandwidth requirement and at the same time to improve the update rate.

The combiner 28 compiles selectively preconfigured contents, e.g. static screen masks with dynamic contents comprising prescribed or prescribable variables and/or parameters. Alternatively, provision may also be made for the combiner 28 to handle dynamically configured contents on the basis of the requirements prescribed by the transmitted data item 18.

In this connection, a return path 34 may be integrated into the data path for receiving and for processing the data item 18 and is used to implement a media selection by the operator using an evaluation unit 36. This is shown to the operator on the operator control appliance 12 before or in connection with the display of the received media data 15 by the encoding means 16, i.e., the media player 16, in a similar manner to selection of the type using a "playlist" (title list). In addition, provision is made for the media player 16 to allow selection of media or commands and to permit general user inputs.

Such an input and a resultant acknowledgement to the automation appliance 10, in particular i.e., the transmission of the data item 18, can be handled using what is known as an "applet", particularly a JAVA applet. In this connection, the invention provides, in particular, for the media data 15 to comprise the respectively required program code instructions, i.e., the respective JAVA applets or JAVA programs, for example. Such program code instructions can allow both standardized and user-specific data interchange services (reading/writing). In this connection, the automation appliance 10 uses the return path 34 to receive such data and commands.

Suitable operator control appliances 12 with a media player 16 implemented thereon, particularly an interactive media player 16, are, besides personal computers, also what are known as PDAs, MDAs, mobile telephones, portable hardware for video display, what are known as streaming clients and what are known as operator panels, i.e., operator control appliances 12, as are known in connection with appliances for automating industrial processes.

The media data 15 can be fast forwarded and rewound, so that it is possible to resort to earlier display and/or input points. An accompanying reversal of inputs (undo) can be handled by the evaluation unit 36. On the operator control appliance 12, it is also possible to record and archive the stream of received media data 15 for documentation or archiving purposes.

The media data 15 can be encrypted on the basis of "DRM (Digital Right Management) rules". It is thus possible to hide technologically sensitive information from an unauthorized operator. In this regard, it is also conceivable to manage a plurality of authorizations depending on the use situation.

Suitable transport layers 32 are, besides the known Internet technology and the accompanying protocols (e.g. TCP/IP), also any other connection option (cf. USB, various wireless techniques, IrDa, Powerline, RS232/V24, etc.).

To update the first and second database 22, 26, i.e., to update the static or dynamic media data 20, 24 held there, the automation appliance 10 has an FTP server 38 or the like. Another option for storing media data in the automation appliance 10 or for updating them there is provided by means of a service channel 39, 40 which is intended for this purpose and which comprises interacting function blocks 39, 40 both on the operator control appliance 12 and on the automation appliance 10, so that media data 41 can also be sent from the operator control appliance 12 to the automation appliance 10, where they are recorded either directly or with a recorder functionality (not shown in more detail), which may also be covered by the evaluation unit 36.

As already mentioned further above in connection with the functionality of fast forwarding and rewinding, it is appropriate to transmit media data, particularly in connection with information which are otherwise held in handbooks, operating instructions and the like. In this connection, provision is preferably made for the media data transmitted also to be audio and video data in the form of a film. This film and also, if appropriate, (JAVA) programs additionally embedded into the media data are used to guide the respective operator through all the necessary control actions and to ask him to make interactive inputs. To be able to handle more extensive multimedia contents, provision is made for parts of such multimedia contents to be supplied to the combiner 28 also from the Internet or from a memory (not shown) associated with the combination of automation appliance 10 and operator control appliance 12. A soundtrack associated with the film may be stored on the operator control appliance 12 in various languages or may be available through the Internet or said memory. Such an apparatus or a corresponding method allows interactive startup with context-related explanations. In this case, full multimedia support also allows target-group-oriented loading of contents, i.e., loading tuned to a different level of education, for example. In connection with startup functions too, provision may be made to render certain contents accessible only to appropriately authorized persons. In this connection, reference is made to the already mentioned "DRM" as an example of an option for handling different ways of accessing the transported information.

For user guidance during startup, it is thus therefore possible to tread entirely new paths which are also largely independent of the appliance available for startup. It is thus possible to have startup supported by, by way of example, appliances such as personal computers, PDAs, mobile telephones etc. Providing the multimedia data in the form of a "media stream" allows startup to be started quickly, since, by way of example, a film in the form of operating instructions does not need to be downloaded onto the operator control appliance 12 completely, unlike in the case of "flash animation", for example.

The present invention can therefore be summarized such that a method for operating an automation appliance 10 is proposed in which media data 15, particularly audio and/or video data, are used to display data relating to the status and/or the configuration of the automation appliance 10.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated. The applicant reserves the right to claim further combinations of features which have to date been disclosed only in the description and/or drawings.

What is claimed as new and desired to be protected by Letters Patent is set forth in the appended claims and includes equivalents of the elements recited therein:

What is claimed is:

1. A method for operating an automation appliance and an operator control appliance connected to the automation appliance, wherein the automation appliance comprises encoding means for encoding at least one of video and audio media data, and the operator control appliance comprises decoding means for decoding the video or audio media data, the method comprising the steps of:
   transmitting at least one data item from the operator control appliance to the automation appliance, said data item including a request for the video or audio media data from the automation appliance,
   generating with the encoding means a continuous data stream of the video or audio media data in accordance with the received at least one data item,
   receiving static media data from a first database, which includes static media data being stored on the automation appliance or static media data accessible by the automation appliance,
   receiving dynamic media data from a second database, which includes dynamic media data being stored on the automation appliance or dynamic media data accessible by the automation appliance,
   combining the static media data and the dynamic media data to produce combined media data,
   encoding the combined media data on the automation appliance to generate the at least one of video and audio media data,
   transmitting the generated video or audio media data from the automation appliance to the operator control appliance, and
   decoding the received video or audio media data with the decoding means for display on the operator control appliance.

2. The method of claim 1, wherein the step of combining static media data and dynamic media data comprises the steps of selecting or producing the data item on the operator control appliance by an operator, associating the static and dynamic media data with the data item selected by the operator based on a predetermined or dynamic relationship, encoding the combined static and dynamic media data, and transmitting the encoded media data the operator control appliance in response to the transmitted data item.

3. The method of claim 1, wherein the dynamic media data comprise data relating to at least one of a status or a configuration of the automation appliance.

4. The method of claim 1, wherein the static media data comprise screen masks and the dynamic media data comprise data relating to at least one of a individual status or configuration information of the automation appliance.

5. The method of claim 1, wherein displaying the media data on the operator control appliance comprises rewinding the media data to positions which were already displayed or fast forwarding the media data to positions which have not yet been displayed.

6. The method of claim 5, wherein the media data comprise position identifiers to be used for verifying past process steps.

7. The method of claim 1, wherein the generated media data are transmitted from the automation appliance to the operator control appliance via a transport layer.

8. An automation appliance comprising:
   means for receiving from a remote appliance at least one data item which includes a request for media data,
   a first database having stored therein static media data,
   a second database having stored therein dynamic media data,
   a combiner for combining the static and dynamic media data to form the media data as a continuous data stream of at least one of video and audio media data,
   an encoder for encoding the combined media data, and
   an interface for transferring the encoded combined media data to the remote appliance for decoding and display.

* * * * *